Sept. 17, 1940.   G. MAY   2,215,271
LENS SYSTEM
Filed Nov. 19, 1938
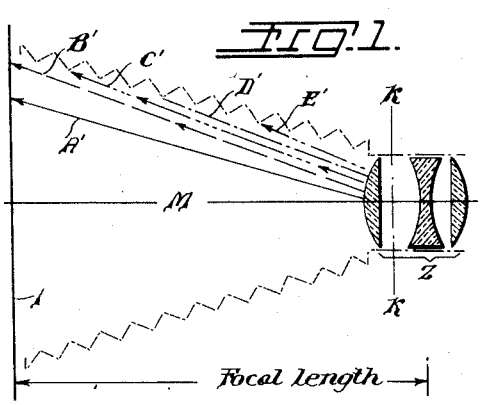
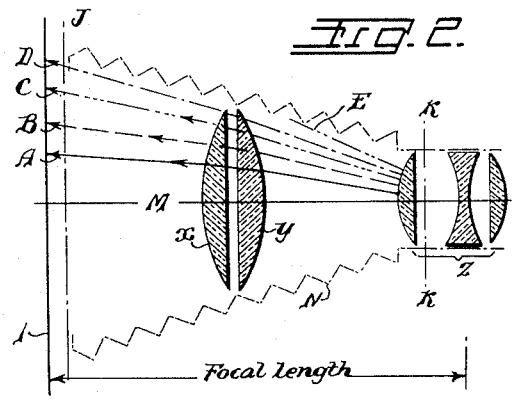
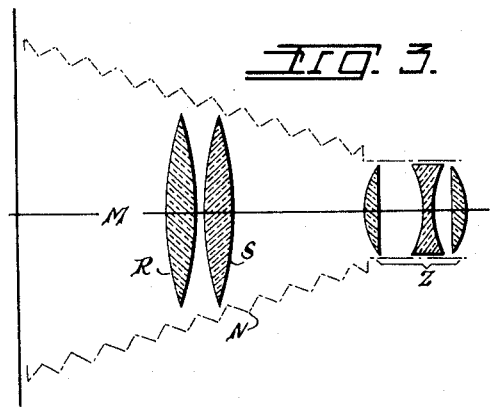
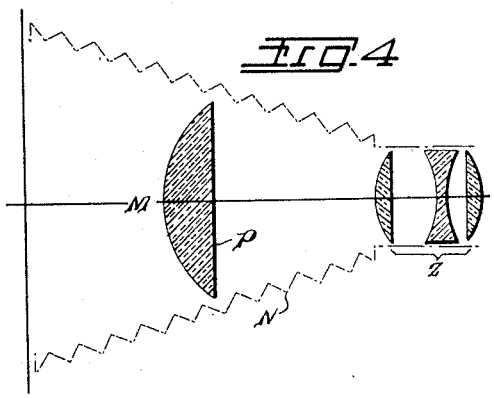
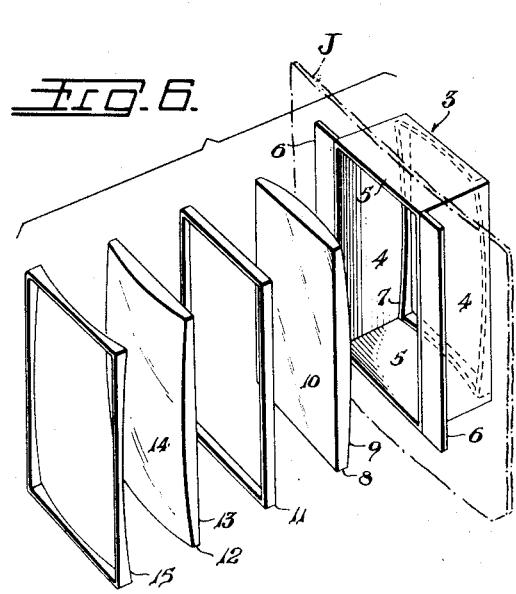
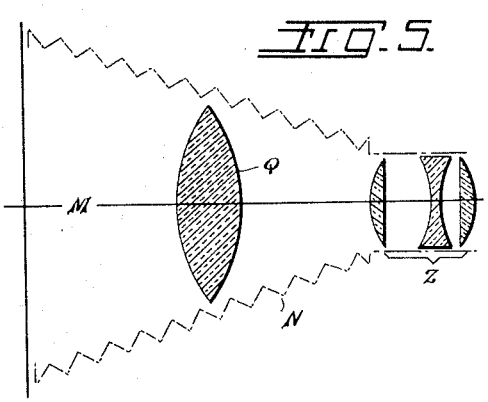
Inventor
GERHARD MAY
By William E. Elliott
Attorney Patented Sept. 17, 1940

2,215,271

UNITED STATES PATENT OFFICE 2,215,271

LENS SYSTEM

Gerhard May, San Francisco, Calif.

Application November 19, 1938, Serial No. 241,454

7 Claims. (Cl. 88—57)

This invention relates to cameras, and more particularly to miniature cameras, and has for its principal object the provision of means for utilizing those light rays which are transmitted through the camera lens but have been ineffective in producing the image on the surface of the film.

Another object is the provision of optical means for intercepting light rays that ordinarily impinge upon the camera bellows and are absorbed thereby and directing these rays toward the film surface.

Another object is the provision of a camera accessory for interposition between the lens and the film of a camera for increasing the effective speed of the camera lens.

A further object is the provision of a lens system for increasing the effective speed of miniature camera lenses, which is cheap to manufacture, may be installed with little modification on cameras already on the market, and produces an image on the film equal in definition to that produced by the lens with which the camera is already provided.

Further objects will appear in the following description:

It is well known that the high speed lenses of the anastigmat type with which miniature cameras are equipped today produce images having excellent definition over the entire film area. Those skilled in the art are also acquainted with the fact that throughout the range of lens apertures this excellence of definition obtains even at the extreme edges of the picture. It is well understood by those familiar with these lenses that a certain amount of light passing through the lens does not strike the film surface, but due to wide divergence of these rays from the lens axis strikes the opaque walls of the bellows where it is absorbed. Such light is of no effect in producing the image on the film but is wasted light, and the larger the amount of this wasted light due to the design of the camera and the various parts affecting the light transmission, the lower will be the lens efficiency. I propose to utilize this wasted light by interposing within the camera between the lens surface and the film a lens system designed to intercept these rays before they strike the bellows and to direct them toward the film surface so that they increase considerably the total light striking the film and thus in effect increase the speed of the lens with which the camera is equipped. Reference will now be made to the drawing in which Figure 1 illustrates diagrammatically the 3-element lens system of a high grade camera and shows the path of light rays emanating from the inner lens and striking the bellows where such rays are absorbed.

Fig. 2 illustrates diagrammatically the application of my improvement to the camera shown in Fig. 1;
Fig. 3 illustrates schematically the use of double-convex lenses in the camera of Fig. 2;

Fig. 4 illustrates schematically the use of a single plano-convex lens in the camera of Fig. 2;

Fig. 5 shows a similar diagrammatic arrangement but employing a double-convex lens; while Fig. 6 shows a lens holding frame, with plano-convex lens elements and spacing frame designed for use in a "Retina" 35 mm. miniature camera.

Referring now to Figure 1, Z indicates an objective lens system having an approximate focal length as indicated. This lens Z is provided on a camera having a bellows indicated by the zigzag broken lines and a focal plane f upon which rays from the lens impinge to form the picture. M indicates the axis of the lens while the line KK indicates the position of the usual between-the-lens shutter. As shown in this figure, rays A' and B' coming from the inner surface of the lens strike the film surface f and thus form the image. Of course these rays shown diagrammatically are merely illustrative of an almost infinite number that pass through the lens and proceed in a straight line to the film surface to give the complete picture. The rays C', D' and E' shown in Figure 1 emanate from the rear curved surface of the lens at such a large angle with respect to the axis M that they do not fall upon the film surface but strike the corrugated wall of the bellows, as shown, where they are absorbed. Thus, these light rays C', D' and E' are of no use in producing the picture but represent so much wasted light which until my improvement, has been unavoidable.

Figure 2 illustrates diagrammatically the application of my improvement to the camera shown in Figure 1. With the lens Z having a focal length of 50 millimeters, I insert within the camera bellows N between the lens Z and film f two plano-convex lenses X and Y each having a focal length of 100 mm. As shown in the figure the plane surfaces face each other and are slightly spaced. As shown in this figure, light rays A, B are intercepted and bent toward the axis M while rays C, D which were formerly lost upon striking the bellows surface are bent in the same general direction as rays A and B so that they too strike the film and aid in producing the image thereon. The ray E, it is noted, has so large an angle of divergence that it strikes the bellows without being intercepted by lenses X, Y. However, the positioning of the lenses X, Y as far toward the lens Z as practicable within the physical shape and dimensions of the bellows greatly increases the number of rays intercepted and thus utilized at the film surface. In the above arrangement with the lenses X, Y in approximately the position shown it may be necessary to move the front plano-convex element of the lens Z a small amount to insure exact focus on the film plane 1. The immediate advantages of my invention as thus described are startling to one accustomed to the operation of such a miniature camera under normal conditions. Pictures taken with the lens system X, Y in the camera are found to be greatly over-exposed but correspond closely in other respects with pictures made with the use of the lenses X, Y. Another practical although not so important difference is found in the slight increase in the field covered by the two lens systems over that covered by the lens Z alone. Thus, pictures made with both lens systems acting together will show a border of the subject matter that would not otherwise be obtained.

In Figures 3 to 5 are shown forms of my invention in which double convex lenses, a single plano-convex lens and a single double convex lens respectively are employed. The lenses R and S in Figure 3 are 100 mm. focal length each and are slightly separated as shown for use in the camera of Figure 1. They are not quite as compact as the lenses X, Y of Figure 2 and are slightly more expensive to manufacture. In other respects they have been found to be equally satisfactory as lenses X, Y.

Figure 4 illustrates how a single plano-convex may be utilized. The lens P has a focal length of 100 mm. to be used with the camera of Figure 1 which is provided with an objective lens Z having a focal length of 50 mm. In this arrangement the lens P is moved further back toward the film than in the other cases mentioned. Of course the further back toward the film the lens is positioned the fewer the stray rays that will be intercepted. Thus, the arrangement of Figure 4 is inferior to that of Figures 2 and 3.

Figure 5 illustrates the use of a double convex lens Q, the characteristics of which follow those found in the use of the lens P of Figure 4. Experiments that have been made indicate that more than two lenses may be employed if desired and that their focal length with respect to the focal length of the lens with which they were to be used is not a fixed factor since good results have been obtained from lenses having slightly different focal length from those stated.

Figure 6 shows the various parts of my device as constructed for use with a 35 mm. "Retina" miniature camera provided with an f. 3.5 anastigmat lens of 50 mm. focal length. In this figure, as in Figure 2, J represents the rear bellows frame having a large rectangular opening through which the light rays pass to strike the film. A rectangular box-shaped member 3 is constructed for closely fitting into said opening in the member J. As shown, this box-shaped member has an open top and an open bottom defined by longitudinally oppositely disposed walls 4 and similar transversely disposed walls 5. The marginal portions 6 are secured along the edges of walls 4 to serve as a stop for the box-shaped member when the latter is positioned to extend into the bellows from the rear thereof. It will be noted that the box-shaped member 3 is provided with curved ledges 7 on the inner walls thereof opposite the marginal portions 6. These ledges 7 serve as a stable support for the lens 8 when the latter is placed thereagainst. The plano-convex lens 8 is similar to the lenses X, Y of Figure 2 but differs in that the sides of the lens have been ground off to give the lens a resulting generally rectangular shape. Lens 12 is similar to lens 8 but turned oppositely as shown. The narrow metal frame 11 having about the same thickness as ledge 7 serves to space the parallel faces of the lenses while frame 15 is similar to frame 11 except for the edges nearest lens 12 which are curved to closely fit the latter as shown. Thus, when lens 8 is slipped into the box-shaped member 3 so that its curved surface 9 fits closely the ledges 7 at their margins while the plane surface of lens 8 is closely spaced from the plane surface 13 of lens 12 by means of the frame 11, a unitary and stable assembly is achieved by the close fit of frame 15 along the curved marginal edges of convex surface 14. The frame 15 makes a very snug fit with the inner walls of the box-shaped member 3 and its top is flush with the top of the box-shaped member 3 and marginal portions 6.

I have found by experiment that when the objective lens system of the above mentioned "Retina" camera is moved forward to its 3½ foot setting, the film positioned immediately behind but not touching the lens 12 is then in sharp focus for infinity with either the double convex lenses of Figure 3 or the plano-convex lenses of Figure 2. The spacing frame 11 of Figure 6 in this case was ⅛ inch thick although this spacing is not critical so long as the facing surfaces do not touch each other. It is advisable to cover the parallel ground edges of the lenses 8 and 12 with black paint to absorb stray light rays.

It was also found desirable in constructing the assembly of Figure 6 to cover all inner metal parts of the frames 3, 11 and 51 with black Scotch tape to minimize stray reflections.

In the embodiment of Figure 6 it was found that the effective speed of the objective lens in this camera was greatly increased by means of my attachment. For example, it was found that an f. 11 opening with the attachment was equivalent to an f. 5.6 opening without the lens attachment. In an actual test it was found that with the arrangement of Figure 6, a fully timed negative was secured at f. 16 with 1/100 of a second with the camera attachment while without the camera attachment an exposure of ½₅ of a second was required to obtain the same negative density. This comparison was based on readings taken with a "Weston" exposure meter and was verified by actual exposures in the camera.

With the above mentioned camera it was found that the bellows could not be collapsed fully with the lens frame inside the camera. This might easily be obviated in any camera by forming the back with a centrally enlarged back portion which the film would follow in a curved offset path. Thus, the box-shaped member would be in a position to the rear of that shown in Figure 6 to allow for the folding of the bellows. Other arrangements will readily occur to one skilled in the art.

It will be noted from the above that my improvement is not limited to a camera having a collapsible bellows but may be utilized in cameras having a lens tube such as those of the well known "Leica" type. In such cameras it will be found desirable to flare the inner wall of the lens tube in an outward direction toward the film to utilize the most light. The general contour of the lens tube will then resemble the conventional bellows. It is also within the scope of this invention to utilize corrected lenses instead of the simple lenses X, Y, etc. shown in the diagrams.

It will be obvious that the invention is not limited to lenses of 50 mm. focal length but may be used on cameras having lenses of other focal lengths within the practical limitations of the particular camera design. It is also of use on the lens systems of moving picture cameras, the narrow field and relative inefficiency of which are well known.

In summarizing, therefore, the salient features of my invention, it should be noted that in employing the lens system X, Y, or R, S, or P or Q or more than two such lenses or any desirable combination thereof, the optical surface facing the objective lens of the camera must be positioned as closely as practicable behind the surface of the objective lens within the camera in order to intercept all the rays possible before they follow their diverging paths to the wall of the bellows and are lost. Once these rays are intercepted, the curvature of such intercepting lenses and any other lenses that may be in the system may be relied on to bend such intercepted rays toward the axis of the objective lens to insure the rays' striking the film. Just how far forward this intercepting lens surface may be located is dependent on the particular camera and also on such factors as the permissible range of movement of the objective lens along its axis, focal length of the objective lens and size of the image area etc. As already stated it will be found desirable to grind off the edges of the lenses as shown in Figure 6 in order that the lens contour will conform to that of the inner outline of the bellows. In every case the thickness of the lens supporting frame will be a minimum so that the lens surface will extend very closely to the bellows wall on all sides and thus be in the most effective light intercepting position possible.

As already indicated this invention is particularly adapted for use with corrected objective lenses such as the anastigmat lens, for example. My improvement greatly increases the effective speed of such lenses inasmuch as it makes available a large amount of light lying outside the usual narrow angle utilized in ordinary cameras. The bending of the rays that would normally strike the film may result in these rays intercepting the film at more nearly a right angle than without the attachment, but this result is merely incidental and does not produce any distortion in the picture due to the fact that a corrected objective lens is employed in the first instance.

Having described my invention what I claim is:

1. In a miniature camera having an objective lens, a plane image receiving surface facing said lens and spaced therefrom and a light impervious enclosure surrounding the light path from said lens to said surface, the combination of an optical system positioned within said enclosure and spaced from said surface, said optical system comprising a plurality of relatively thin lens elements axially spaced and in optical alinement with the camera objective lens and positioned adjacent to said image receiving surface and between said surface and the camera objective lens, said lens elements extending completely across said light path and terminating substantially at said enclosure on all sides thereof for intercepting the diverging light rays that would normally strike the walls of the enclosure and be absorbed and directing said rays onto said plane image receiving surface.

2. The combination as set forth in claim 1 in which said optical system comprises two spaced, plano-convex lenses.

3. The combination as set forth in claim 1 in which said optical system comprises two spaced, double-convex lenses.

4. An attachment for increasing the effective speed of miniature camera lenses which comprises a hollow, box-shaped member having narrow, curved ledges contiguous to the lower margins thereof, a plano-convex lens having its curved surface closely fitting against said ledges, a hollow spacing frame resting upon the plane surface of said lens, a second plano-convex lens having its plane surface abutting the opposite side of said frame and a locking frame having curved edge portions for resting against said second plano-convex lens upon the curved surface thereof for securing said member, lenses and frame in assembled relation.

5. A miniature camera having an objective lens, a plane image receiving surface facing said lens and spaced therefrom and a light impervious enclosure surrounding the light path from said lens to said surface, the portion of said enclosure adjacent the light receiving surface serving to frame the ray path to said surface, and an optical system removably mounted in the adjacent portion of said enclosure, said optical system comprising a plurality of relatively thin lens elements, axially spaced and in optical alinement with the camera objective lens and positioned adjacent to said image receiving surface, and between said surface and the camera objective lens for intercepting the marginal rays from said objective lens and directing them to the plane image receiving surface.

6. A miniature camera having an objective lens, a plane image receiving surface facing said lens and spaced therefrom and a light impervious enclosure surrounding the light path from said lens to said surface, the portion of said enclosure adjacent the light receiving surface serving to frame the ray path to said surface, and an optical system mounted in said enclosure, said optical system comprising a plurality of relatively thin lens elements, axially spaced and in optical alinement with the camera objective lens and positioned adjacent to said image receiving surface, and between said surface and the camera objective lens for intercepting the marginal rays from said objective lens and direcing them to the plane image receiving surface.

7. The combination as set forth in claim 6 in which each of said lens elements has a focal length approximately twice that of said objective lens.

GERHARD MAY.